United States Patent

[11] 3,589,832

[72] Inventors George F. Harris
Redondo Beach, Calif.;
James W. Massey, Scottsdale, Ariz.
[21] Appl. No. 885,164
[22] Filed Dec. 15, 1969
[45] Patented June 29, 1971
[73] Assignee The Garrett Corporation
Los Angeles, Calif.

[54] PROPELLER SYNCHROPHASER SYSTEM
9 Claims, 2 Drawing Figs.
[52] U.S. Cl. .................................................. 416/34
[51] Int. Cl. ............................................. B64c 11/50
[50] Field of Search ........................................ 416/34, 35;
318/41, 85

[56] References Cited
UNITED STATES PATENTS
3,007,529 11/1961 Brockert et al. .............. 416/34
3,066,741 12/1962 Barnes ......................... 416/34

Primary Examiner—Everette A. Powell, Jr.
Attorneys—Herschel C. Omohundro and John N. Hazelwood ABSTRACT: A combined system for synchronizing engine speed and propeller blade phase on multiengine craft with hydraulic blade pitch adjustment wherein each engine has a speed sensor and propeller blade position sensor. Electronic signal comparator and error signal generating circuits effect adjustment of speed governors and propeller blade pitch actuators to first secure engine speed synchronization and propeller blade synchrophasing, the latter being performed without affecting the former.

INVENTORS.
GEORGE A. HARRIS,
JAMES W. MASSEY,

By

Herschel C. Omohundro
ATTORNEY.

3,589,832

PROPELLER SYNCHROPHASER SYSTEM

SUMMARY

This invention relates generally to aircraft engine control mechanisms and more particularly to mechanism for controlling the speed of at least one of a plurality of engines to effect the synchrophasing of propellers driven by such engines. As used herein with reference to propellers, the word "synchrophasing" the practice of adjusting one or more of the propellers to cause rotation of all the propellers about their axes at the same precise rate, with the individual blades of each of the propellers disposed at all times in precisely the same or allochiral angular positions relative to a selected reference line radiating from the propeller axis as the corresponding blades on each of the other propellers relative to similar reference lines radiating from the axes of rotation of such propellers.

Heretofore, mechanism has been provided for synchronizing the of a multiengine craft to avoid or eliminate objectionable throbbing or "beats." Such prior mechanism, which is exemplified by U.S. to Leeson, Jr., No. 3,206,640 and No. 3,206,641 to Woodward Governor Company has been partially successful but the propellers may still be out of phase with one another even though the engines are operating in exact synchronization. When the blades of the different propellers are angularly relative to the blades on the other propellers, disagreeable noise and/or vibration results. It is an object of this invention to provide a mechanism for use with a plurality of propeller driving engines to precisely adjust the speed of one or more of the engines to place the blades of propellers driven thereby in exact synchronophase, i.e., at the same or allochiral angular position relative to corresponding predetermined reference lines radiating from the axes of rotation of the propellers.

Another object of this invention is to provide a combination of systems one of which initially adjusts or regulates the speed of rotation of the engines until they are synchronized and then the other system precisely adjusts at least one propeller, termed the "slave," until the blades thereon are synchrophased with the blades of the other, termed the "master."

Another object of this invention is to provide a mechanism for the blades of a variable pitch propeller in small increments each of which is executed with sufficient force to overcome inherent resistance or friction in the mechanism and thus avoid hysteresis.

A further object of the invention is to provide a mechanism for use particularly with propellers of the hydraulically actuated variable pitch type, which have a governor responsive to engine speed to control the application of fluid pressure to the actuator, to supplement the action of the governor in response to signals generated by means which sense the relation of one or more propeller blades to a predetermined reference point.

A still further object of the invention is to provide master and slave propellers of the type having hydraulic governors with means for sensing the positions of blades on such propellers relative to selected points and generating signals which are compared and/or combined to create an error signal reflecting an out-of-phase condition of the propeller blades, then causing the momentary application of fluid pressure to the pitch-actuating mechanism of at lease one propeller while maintaining the governor setting thereof to cause the propeller pitch to increase or decrease until the blades thereon are in phase with the blades of the other propeller.

Another object of the invention is to provide the propeller synchrophasing mechanism referred to in the previous paragraph switch means for bypassing the hydraulic governor whereby the pitch of the propeller may be adjusted in small increments while the of the governor employed to synchronize engine operation is maintained. Other objects and advantages of the invention will be apparent from the following description and the accompanying drawing.

DETAILED DESCRIPTION

Figure 1:
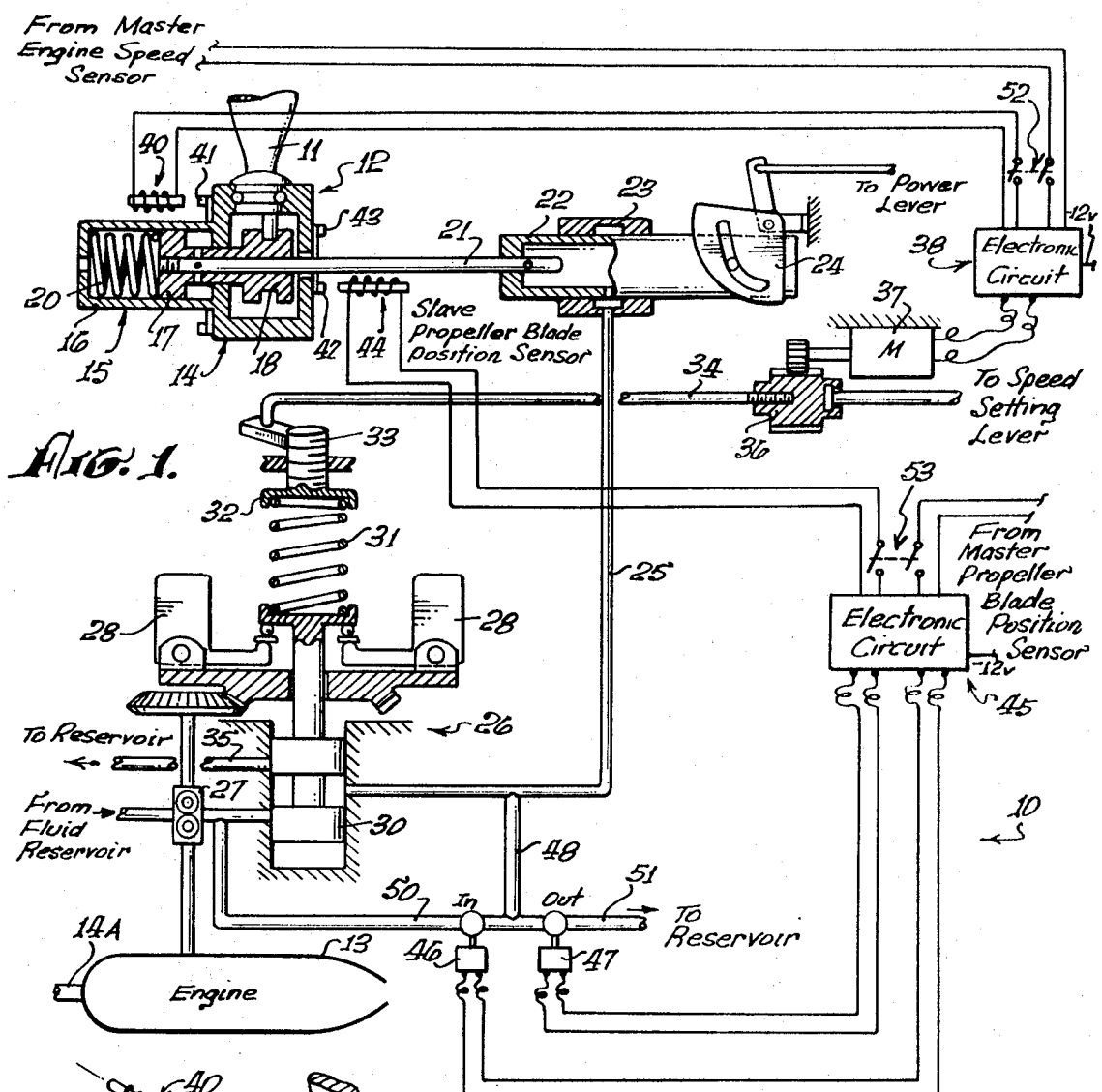
FIG. 1 is a diagrammatic view of a system for synchrophasing aircraft propellers embodying the present invention.
Figure 2:
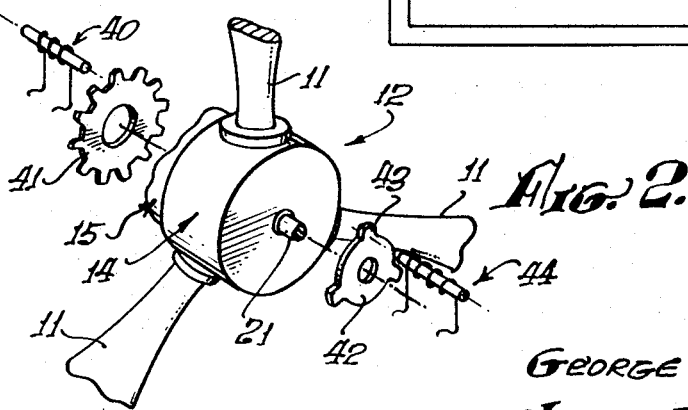
FIG. 2 is a schematic view of means for sensing propeller speed and blade position used in the system illustrated in FIG. 1.

More particular reference to FIG. 1 of the drawing will show that the system 10 embodying the invention is provided to control the pitch of blades 11 of a propeller (designated generally by the numeral 12) arranged to be driven by an engine 13. The propeller 12 is of substantially conventional hydraulically actuated variable pitch type having a hub 14 driven by engine shaft 14A and on which the blades 11 are supported for pivotal adjustment about radially extending axes to vary their pitch. The hub 14 inches an actuator 15 with a cylinder 16 receiving a piston 17 connected with a blade-moving spool 18. A spring 20 in cylinder 16 tends to move the piston and spool in one direction to place the blades at a predetermined pitch. The piston is moved in opposition to the force of the spring by fluid under pressure admitted to the cylinder 16 through a tube 21 This tube is secured to the piston and extends from the hub to a follower sleeve 22 which is movably supported in a manifold body 23. A cam 24 operated by a pilots power lever (not shown) is provided to move the sleeve 22 in a power-selecting operation. Fluid under pressure is supplied to manifold 23 via passage 25 leading from a propeller governor 26. The later is supplied with fluid under pressure by an engine driven pump 27.

Governor 26 is also a substantially conventional component with flyweights 28 driven by engine 13 to move a valve spool 130 in opposition to a speeder spring 31. The effective location of the latter is set by an abutment 32 suitably supported for adjustment, as at 33, by a control linkage 34 leading from a pilot's speed-setting lever (not shown). By adjusting abutment 32, the effective setting of the spring can be secured, the spring tending to oppose movement of the valve spool by the 28. At a selected setting of speed-setting lever, the engine 13 will operate at a rate at which the flyweights 28 will position the spool 30 in a location where it will block communication between passage 25 and pump 27 and also between passage 25 and another passage 35 leading to a reservoir (not shown). In such conditions the engine will be driving the propeller at a speed corresponding with the selected setting. If the load change, the engine speed will vary, causing the flyweights to shift the spool position and admit fluid to or release it from cylinder 16 to change the propeller pitch to compensate for the load change.

As in the above-mentioned patents to Leeson, Jr., the linkage 34, between the propeller governor and the pilot's speed-setting lever, is provided with an adjustment 36 driven by a reversible motor 37 to effect a change in the governor setting response to an error signal supplied to the motor 37 by an electronic circuit 38. The latter includes a magnetic pickup device or speed sensor 40 provided on both master and slave engines or propeller. Toothed wheels or gears 41 rotate with the engine shafts or propellers adjacent the sensors to generate signals commensurate with engine speed. Such signals from the master and slave engines are compared in the electronic circuit 38 and if engine speeds are different, provide an error signal which is transmitted to the motor 37 to cause it to adjust the linkage of the slave engine governor to vary the speed of the slave engine and synchronize it with that of the master engine. As pointed out above, even though the master and slave engine speeds may be synchronized, the propellers thereon may still be out of phase with one another The present invention improves the apparatus (previously described to lay a foundation) by providing means for synchrophasing the propellers of the plurality of engines without disturbing the governor speed setting.

The objectives are secured by supplying means for effecting slight propeller pitch changes and corresponding momentary speed changes. Such means includes a second disc or wheel 42 having teeth or projections 43 corresponding in number to the number of blades on the propeller. Both master and slave propellers are equipped with such wheels which are oriented in a predetermined manner relative to a selected point or line radiating from the axis of rotation of the propeller. A second magnetic sensor 44 is disposed to be influenced by the teeth on the wheel hereby signals are generated commensurate with propeller rotation. The sensors 44 of the master and slave propellers are connected with an electronic circuit 45, which may be similar to circuit 38, and wherein the signals from master and slave sensors 44 are compared. If the blades of the master and slave propellers are not in phase, an error signal with be generated and supplied to one or the other of a pair of electroresponsive, normally closed valves 46 and 47. These valves are connected with a passage 48 branching from passage 25. Valve 46 is disposed in a bypass line 50 leading from the outlet of pump 27 around the governor 26, while valve 47 is arranged in a line 51 leading to the fluid reservoir. It will be obvious that if valve 46 is opened, fluid under pressure from pump 27 will flow to the propeller pitch actuator 15 to effect a pitch change in one direction. If valve 47 is opened, fluid may bleed from the propeller pitch actuator 15 to effect a pitch change in the opposite direction. The electronic circuit is arranged to transmit a series of short, full strength signals, rather than one long signal, so that successive pulses of full fluid pressure will be applied to or released from the pitch actuator, thereby overcoming friction inherent in the system.

It will be observed that through the provision of the invention fluid pressure impulses may be transmitted to and released from the actuator without change in the position of the governor spool valve 30. If desired or found necessary, lost motion may be built into the link mechanism 34 to permit some temporary minor variation in propeller speeds without affecting the engine speed synchronizing portion of the system. The control system will thus provide for a relatively coarse or primary synchronization of engine speed followed by a more precise adjustment to effect the synchrophasing of the propeller blades. The separate engine synchronizing and blade synchrophasing portions of the system could, if desired, be provided with switch means 52 and 53, respectively, whereby the engine synchronizing and propeller blade synchrophasing operations could be performed separately at the will of the pilot

We claim:

1. Apparatus for synchrophasing variable pitch propellers on a multiengine craft, such propellers being of the type having a speed responsive governor, comprising:
   a. a first means responsive to the rotation of the propellers to generate signals corresponding to the speed and phase of operation thereof, such means having a part with elements corresponding to the number of blades on each propeller;
   b. circuit means connected with said first means for receiving and comparing the signals therefrom and generating error signals resulting from differences in phases of operation of the propellers; and
   c. electroresponsive means connected with said circuit means for effecting pitch adjustment of at least one of the variable pitch propellers, independently of the governor thereof, in response to such error signals.

2. A propeller synchrophasing apparatus as defined in claim 1 in which the pitch-varying means is fluid pressure responsive and the electroresponsive means is a valve means for controlling the application of fluid pressure to said pitch-varying means.

3. A propeller synchrophasing apparatus as defined in claim 1 in which the pitch-varying means is hydraulically operated and the electroresponsive means is a valve means for controlling the application of hydraulic pressure to said pitch-varying means.

4. A propeller synchrophasing apparatus as defined in claim 3 in which the circuit means generates error signals of a first type when certain differences in phases of propeller operation exist and error signals of a second type when certain other differences in phases of propeller operation exist, and said valve means is operative to apply hydraulic pressure to said pitch-varying means when the first type error signals are received and to bleed hydraulic pressure from said pitch-varying means when the second type error signals are received.

5. A propeller synchrophasing apparatus as defined in claim 3 in which a bypass extends around the speed responsive governor and the electroresponsive valve means communicates with the bypass passage.

6. A propeller synchrophasing apparatus as defined in claim 5 in which the electroresponsive valve means has an element in the bypass passage to apply fluid pressure to the pitch-varying means to change the blade pitch in one direction and another element between the bypass passage and an outlet to remove fluid pressure from the pitch-varying means to change the blade pitch in the opposite direction.

7. A propeller synchrophasing apparatus as defined in claim 1 in which the circuit means has portions for generating error signals resulting from differences in both engine speeds and propeller blade phases of operation and the electroresponsive means has a first portion responsive to speed error signals to adjust the speed governor of a selected engine and a second portion responsive to blade phase error signals to effect pitch adjustment of the propeller of the selected engine independently of the governor thereof.

8. A propeller synchrophasing apparatus as defined in claim 7 in which the pitch-varying means is fluid pressure responsive and the second portion of the electroresponsive means has valve means for controlling the application of fluid pressure to said pitch-varying means.

9. A propeller synchrophasing apparatus as defined in claim 7 in which means are provided for selectively effecting the adjustments of the speed governor and the propeller blade pitch.